United States Patent [19]
Yanai

[11] Patent Number: 6,137,552
[45] Date of Patent: *Oct. 24, 2000

[54] LIQUID CRYSTAL PANEL HAVING A HIGH APERTURE RATIO AND LIGHT-SHIELDED CHANNELS

[75] Inventor: Kouichi Yanai, Tokyo, Japan

[73] Assignee: Nec Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/861,631

[22] Filed: May 22, 1997

[30] Foreign Application Priority Data

May 22, 1996 [JP] Japan ..................... 8-126942

[51] Int. Cl.⁷ .................. G02F 1/136; G02F 1/1333; G02F 1/1335
[52] U.S. Cl. .............. 349/44; 349/110; 349/106
[58] Field of Search ................... 349/110, 111, 349/106, 139, 43, 44

[56] References Cited

U.S. PATENT DOCUMENTS

| | | | |
|---|---|---|---|
| 4,636,038 | 1/1987 | Kitahara et al. | 349/110 |
| 4,818,075 | 4/1989 | Takao et al. | 349/106 |
| 5,585,951 | 12/1996 | Noda et al. | 349/122 |
| 5,631,753 | 5/1997 | Hamaguchi et al. | 349/110 |
| 5,721,599 | 2/1998 | Cheng | 349/106 |
| 5,754,261 | 5/1998 | Lyu | 349/110 |
| 5,847,792 | 12/1998 | Kobayashi et al. | 349/110 |

FOREIGN PATENT DOCUMENTS

| | | |
|---|---|---|
| 63-81327 | 4/1988 | Japan . |
| 3-167524 | 7/1991 | Japan . |
| 4-253028 | 9/1992 | Japan . |
| 6-301057 | 10/1994 | Japan . |
| 7-134290 | 5/1995 | Japan . |
| 7-248507 | 9/1995 | Japan . |
| 8-122768 | 5/1996 | Japan . |

*Primary Examiner*—James A. Dudek
*Assistant Examiner*—Toan Ton
*Attorney, Agent, or Firm*—Sughrue, Mion, Zinn, Macpeak & Seas, PLLC

[57] ABSTRACT

An objective of this invention is to provide a display improved in its brightness by increasing its aperture ratio while preventing a malfunction of TFTs due to incidence of rays from an external light on a back channel of the TFTs. This invention provides a liquid-crystal panel comprising (a) a thin-film transistor substrate comprising a transparent insulating substrate on which thin-film transistors and pixel electrodes are formed, (b) a counter substrate comprising a transparent insulating substrate on which a counter electrode is formed, and (c) a liquid crystal material sandwiched between the thin-film transistor substrate and the counter substrate, wherein each of the pixels partitioned with a plurality of scanning lines and a plurality of signal lines orthogonal to the scanning lines comprises at least one of the thin-film transistors and the pixel electrodes controlled by the thin-film transistors, characterized in that each pixel comprises a color-filter layer formed on the insulating substrate; a light-shielding film made of metal formed on the color-filter layer, covering a channel between source and drain electrodes of the thin-film transistor; and the pixel electrode formed on the color-filter layer covering the whole surface of the pixel area.

24 Claims, 4 Drawing Sheets

LIQUID CRYSTAL PANEL HAVING A HIGH APERTURE RATIO AND LIGHT-SHIELDED CHANNELS

BACKGROUND OF THE INVENTION

1. Field of the Invention

This invention relates to an active-matrix type of liquid-crystal display using a thin-layer transistor (referred to as "TFT"), in particular a color liquid-crystal panel equipped with a color filter.

2. Description of the Related Art

The following will describe an example of a conventional active-matrix type of liquid-crystal panel disclosed in JPA 6-301057, by reference to FIG. 4.

A liquid-crystal layer 18 is sandwiched between a TFT substrate 21 and a counter substrate 22. On the TFT substrate 21 are formed source electrodes 7 and drain electrodes 6 made of metal, semiconductor layers 23 made of an amorphous material or the like, gate insulating films 3 made of silicon oxide or silicon nitride, gate electrodes 2 made of metal which are also a part of scanning lines, signal lines 20 made of metal, each of which contacts with the source electrode 7 and is orthogonal to scanning lines, and interlayer insulating films 24 for ensuring insulation between a scanning line and a signal line 20. On these are formed color filter layers 8 consisting of red, green and blue-colored insulating films (9, 10 and 11, respectively), on which are formed pixel electrodes 13 of transparent, electrically-conductive films made of indium-tin oxide (referred to as "ITO") or the like, electrically connecting with the drain electrodes 6.

Meanwhile, on the whole surface of an insulating substrate 15 is formed a counter electrode 16 of a transparent, conductive film made of such as ITO.

The TFT substrate 21 and the counter substrate 22 are put together via the liquid crystal layer with a thickness of 3 to 10 μm.

FIG. 4 shows a coplanar type of TFT, but a reverse-staggered type of TFT is also common.

For the above panel, when a TFT is coplanar, rays from a back light or the like directly impinge on the back channel of the semiconductor layer in a translucent type of liquid-crystal display because there is nothing which blocks the rays on the back-channel side of the semiconductor layer in the liquid-crystal panel. When a TFT is a reverse staggered type, there is a color filter on the back-channel side of the semiconductor layer, but any of the red, green and blue filters cannot adequately shield the semiconductor layer from an external light. Thus, there exists a problem that both coplanar and reverse-staggered types of TFT may fail to normally function due to induction of an off-leak current in the semiconductor layer, resulting in a defective display.

To solve the above problem, it is effective to place a light-shielding layer for blocking incident rays on a TFT. JP-A 4-253028 discloses a liquid-crystal display utilizing such an approach. The liquid crystal display, however, has a problem that since pixel electrodes are formed inside of signal and scanning lines, the area through which rays pass is reduced, that is, a so-called aperture ratio is reduced, resulting in a darker display.

SUMMARY OF THE INVENTION

An objective of this invention is to provide a display improved in its brightness by increasing its aperture ratio while preventing a malfunction of TFTs due to incidence of rays from an external light on a back channel of the TFTs.

This invention provides a liquid-crystal panel comprising (a) a thin-film transistor substrate comprising a transparent insulating substrate on which thin-film transistors and pixel electrodes are formed, (b) a counter substrate comprising a transparent insulating substrate on which a counter electrode is formed, and (c) a liquid crystal material sandwiched between the said thin-film transistor substrate and the said counter substrate, wherein each of the pixels partitioned with a plurality of scanning lines and a plurality of signal lines orthogonal to the said scanning lines comprises at least one of the said thin-film transistors and the said pixel electrodes controlled by the said thin-film transistors, characterized in that each pixel comprises a color-filter layer formed on the said insulating substrate; a light-shielding film made of metal formed on the said color-filter layer, covering a channel between source and drain electrodes of the said thin-film transistor; and the said pixel electrode formed on the color-filter layer covering the whole surface of the said pixel area.

The pixel electrode, which is formed at least on the whole surface of each pixel, may be formed partly overlapping the area of the scanning and/or signal lines.

In a panel according to the present invention, a pixel electrode is enlarged at its maximum to give a high aperture ratio and thus a bright display. In addition, this invention can solve the problem that induction of an off-leak current or capacity coupling between drain and source causes a malfunction of the TFTs, resulting in a defective display. Furthermore, in the panel of this invention, reduction of contrast due to disclination near the edge of the light-shielding film in the pixel electrode, can be prevented.

DETAILED DESCRIPTION OF THE PREFERRED EMBODIMENTS

Preferred embodiments of the present invention will be detailed in connection with FIGS. 1 to 3.

Figure 1:
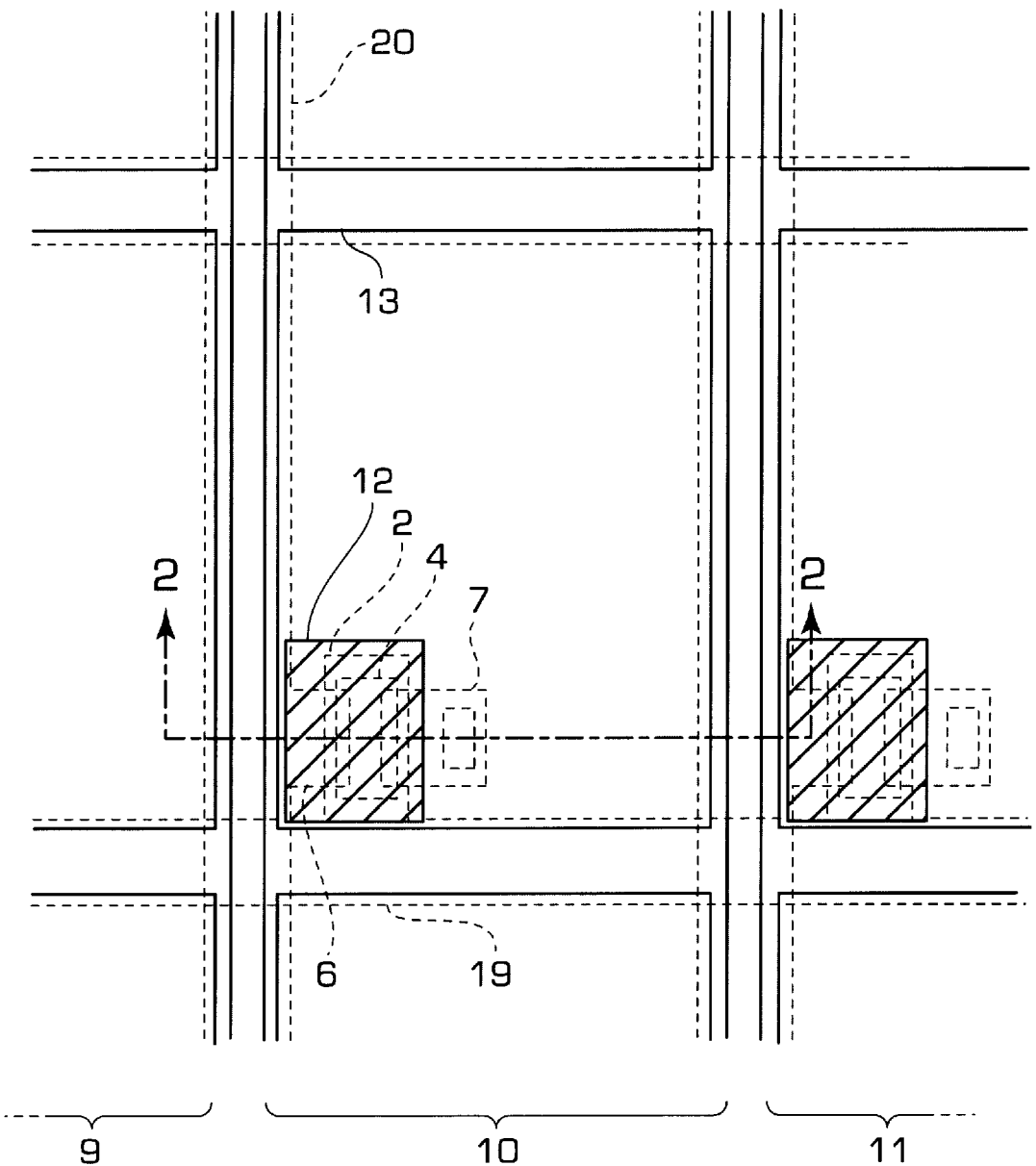
FIG. 1 is a plan view of the liquid-crystal panel of this invention in Example 1.

A liquid-crystal panel of this invention has a transparent insulating substrate 1 on which a plurality of TFTs and pixel electrodes 13 are formed in the areas partitioned with a plurality of parallel scanning lines 19 and a plurality of signal lines 20 orthogonal to the scanning lines (See FIG. 1). The panel of this invention comprises a TFT substrate 21 comprising these TFTs and pixel electrodes 13; a counter substrate 22 comprising a transparent insulating substrate 15 on which a transparent counter electrode 16 is formed; and a liquid-crystal material 18 sandwiched between the substrates 21 and 22.

On a TFT is formed a color-filter layer 8 on which a light-shielding film 12 is formed. The light-shielding film 12 is made of metal and completely covers the TFT. A transparent pixel electrode 13 is formed over an area partitioned by a plurality of scanning lines 19 and a plurality of signal lines 20. The light-shielding film 12 may be formed on or under the pixel electrode 13 as shown in FIG. 2 or FIG. 3, respectively.

EXAMPLE 1

Figure 2:
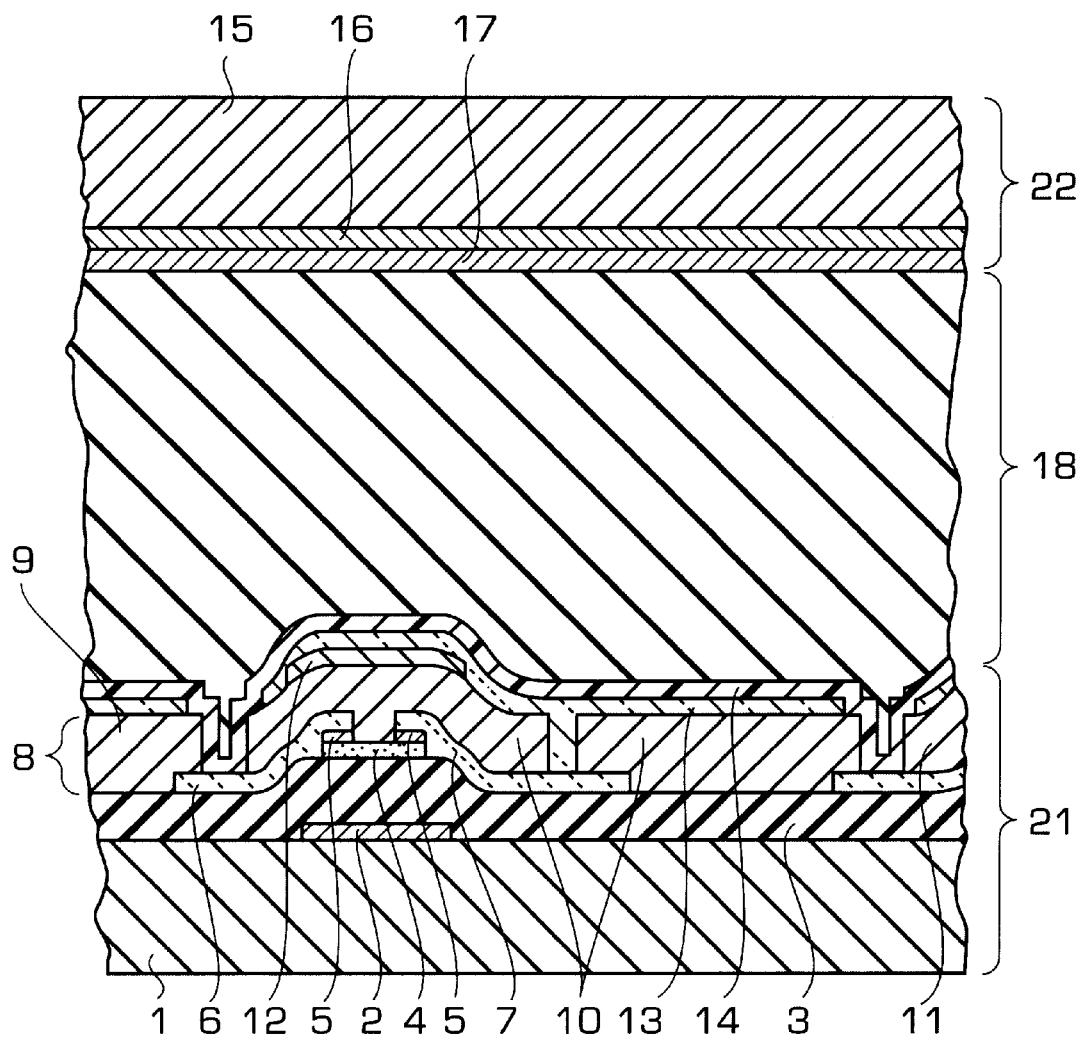
FIG. 2 is a sectional view taken on line A—A in FIG. 1.

FIG. 1 is a plan view showing a structure of a liquid-crystal panel in an embodiment of this invention, and FIG. 2 is a sectional view taken on line A—A of FIG. 1.

A process for preparing the liquid-crystal panel of this invention will be described.

Gate electrodes 2 and scanning lines 19 are formed on a transparent insulating substrate 1 made of glass or the like. Gate insulating films 3 are formed to cover the gate electrodes 2 and the scanning lines 19, and i-type semiconductor layers 4 made of amorphous silicon are then formed on the gate electrodes 2 via the gate insulating films 3. On the i-type semiconductor layers 4 are formed n$^+$-type semiconductor layers 5 made of amorphous silicon, on which drain electrodes 6, source electrodes 7 and signal lines 20 are formed. Thus, TFTs are formed.

Color filter layers 8, that is, red-, green- or blue-colored insulating films (9, 10 or 11, respectively) are then formed over the areas partitioned by the signal lines 20. The color-filter layers 8 may overlap the signal lines 20 in part. A metal light-shielding film 12 is then formed on each of the color-filter layers 8 to completely cover a channel between source and drain electrodes of a TFT.

Pixel electrodes 13 are then formed on the color filter layers 8 and the metal light-shielding films 12. Each of the pixel electrodes 13 is formed, covering at least the whole area partitioned by a plurality of scanning lines and a plurality of signal lines. The area where the pixel electrode 13 is formed may overlap the area of the scanning or the signal lines. There is an electrical continuity between the pixel electrode 13 and the source electrode 7.

Forming an oriented film 14 over the pixel electrodes 13 gives a TFT substrate 21.

On the other hand, a counter substrate 22 is prepared by forming a counter electrode 16 on a transparent insulating substrate 15 made of glass or the like, on which an oriented film 17 is formed.

Finally, a liquid-crystal layer 18 is sandwiched between the TFT substrate 21 and the counter substrate 22, to give a liquid-crystal panel of this invention.

Individual elements of a liquid crystal panel of this invention may be prepared by means of various processes including the following specific procedure.

A gate electrode 2, a scanning line 19, a drain electrode 6, a source electrode 7 or a signal line 20 is formed by depositing metal such as aluminum and chromium using a spattering process or the like, and then performing a usual photolithography using a positive resist or the like. A pixel electrode 13 or a counter electrode 16 is formed by spattering and photolithography as described above except for using a transparent conductive material such as ITO. A gate insulating film 3, an i-type semiconductor layer 4 or a n$^+$-type semiconductor layer 5 is formed by forming a film using a continuous CVD and then photolithography. A color filter 8 consisting of a red-, green- or blue-colored insulating film (9, 10 or 11, respectively) is formed by applying, with a spinner, a colored negative resist consisting of a photosensitive acrylic resin in which a pigment is evenly dispersed, and conducting photolithography, for all of the 3 colors of red, green and blue. Besides an acrylic resin, a photosensitive resin may include a polyimide resin. The color-filter layer 8 preferably has a thickness of 1.0 to 1.5 μm. A metal light-shielding film 12 is formed by depositing metal such as aluminum and chromium using a spattering process or the like and conducting usual photolithography using a positive resist. The metal light-shielding film 12 preferably has a thickness of 1000 to 5000 Å. Oriented films 14 and 17 are formed by applying a polyimide solution with a spinner or by means of screen printing.

In the liquid-crystal panel of this example, the area of the pixel electrode 13 covers the whole area partitioned by the scanning lines 19 and the signal lines 20, and overlaps the scanning and the signal lines in part. The liquid-crystal panel of this example could control the rays passing through the whole area except those of the metal light-shielding films 12, the scanning lines 19 and the signal lines 20, showing a high aperture ratio of 80%. In addition, since the metal light-shield films were formed over the back channels of the TFTs via the color-filter layers in the TFT substrate, external rays did not enter the back channels, reducing an off-state current to $10^{-13}$ A. This solved the problem that an induced off-leak current causes a malfunction of TFTs, resulting in a defective display. Furthermore, the metal light-shielding films formed over the drain and the source electrodes via insulating color-filters with a thickness of at least 1 μm could solve the problem that TFTs may fail to normally function due to a capacity coupling between drain and source electrodes, resulting in a defective display. In addition, since the metal light-shielding films 12 had a thickness of as low as several thousand angstroms and therefore forming the pixel electrodes 13 on the film created only a small level-difference near the edge of the metal shielding film 12, disclination due to inadequate rubbing did not occur.

EXAMPLE 2

Figure 3:
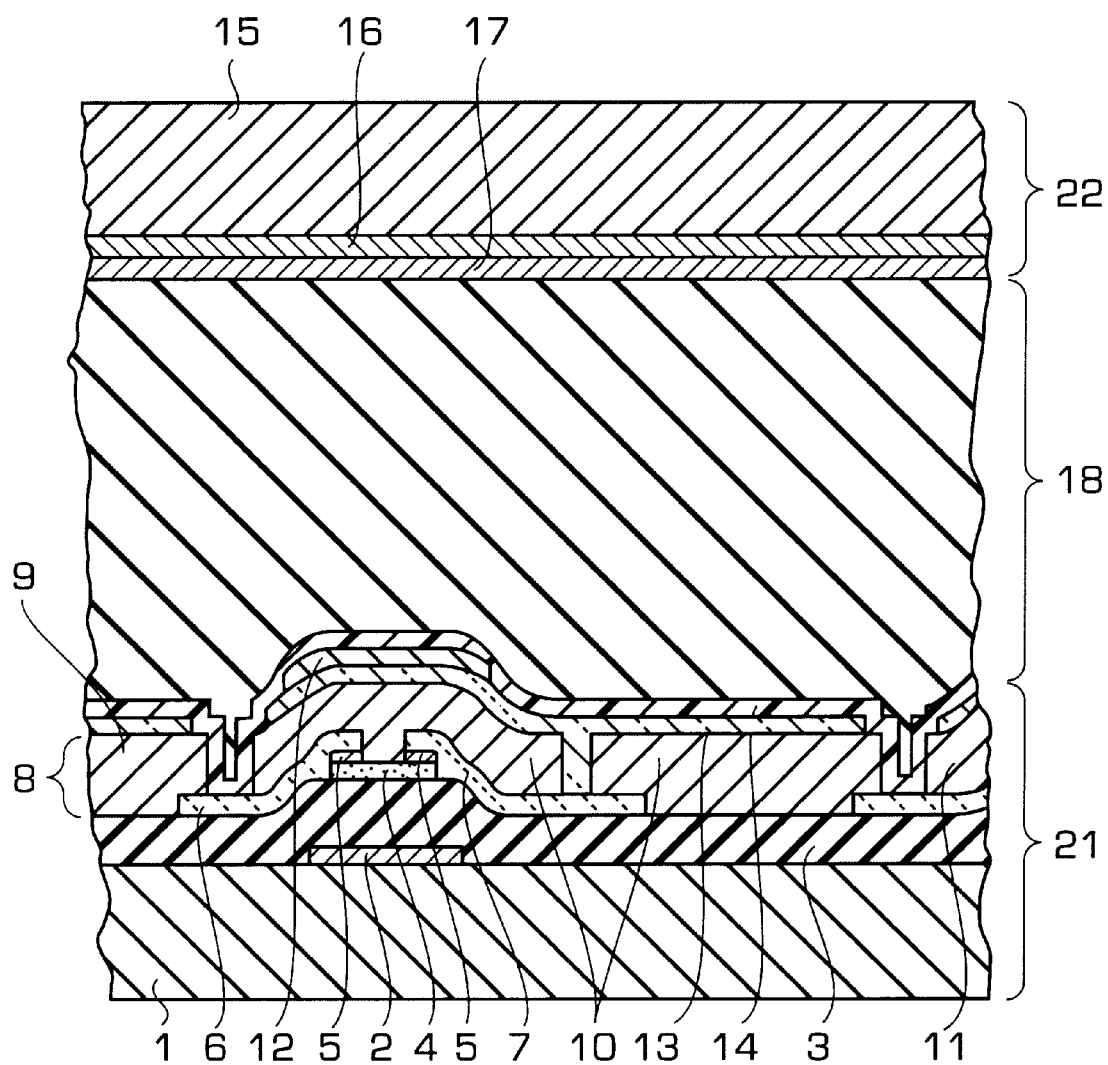
FIG. 3 is a partially sectional view of the liquid-crystal panel of/this invention in Example 2.
Figure 4:
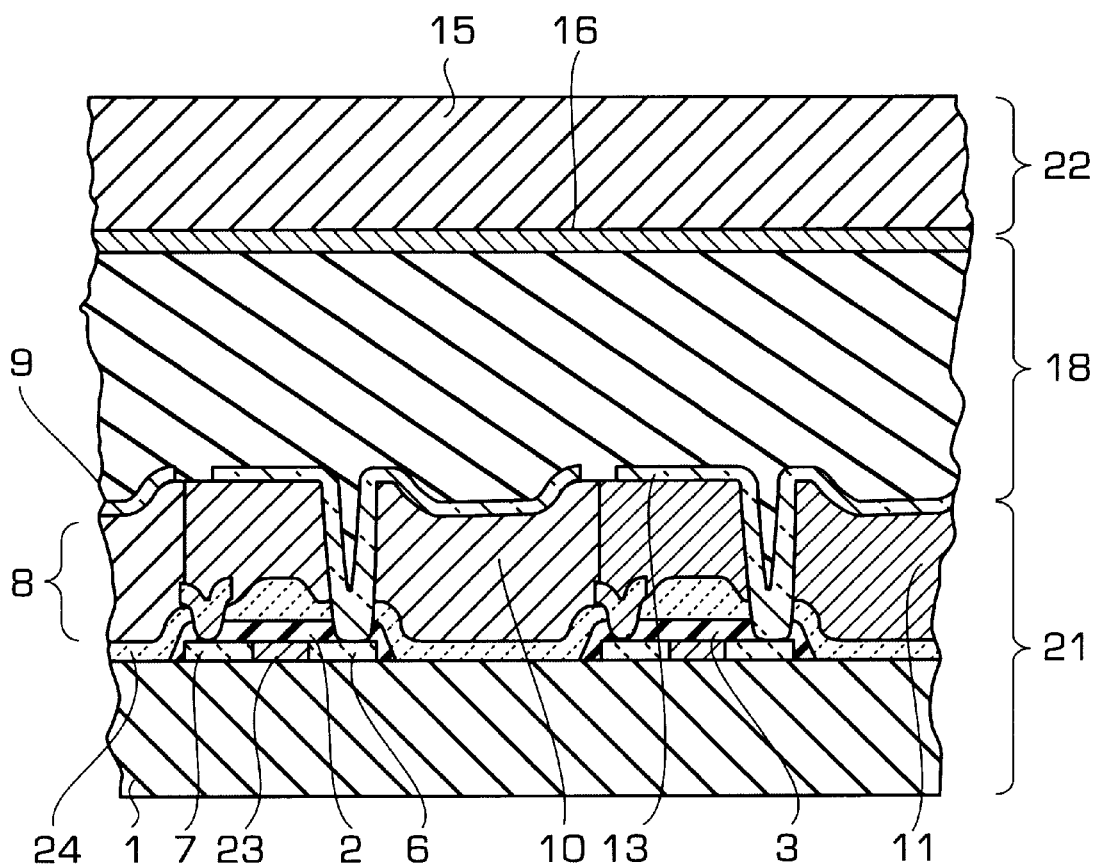
FIG. 4 is a partially sectional view of a liquid-crystal panel according to the prior art.

FIG. 3 is a sectional view showing a structure of a liquid-crystal panel in a second embodiment of this invention. The liquid-crystal panel has the same structure formed by the same process as described in Example 1, except that the order of a metal light-shielding film 12 and a pixel electrode 13 is reversed. The panel gave a high aperture ratio of 80% as in Example 1. An off-state current was reduced to $10^{-13}$ A, and there no a defective display caused by a malfunction of TFTs due to an induced off-leak current or a capacity coupling between drain and source electrodes. Furthermore, disclination due to inadequate rubbing did not occur.

What is claimed is:

1. A liquid-crystal panel comprising:
   (a) a thin-film transistor substrate comprising a first transparent insulating substrate;
   (b) a counter substrate comprising a second transparent insulating substrate;
   (c) a liquid crystal material between said thin-film transistor substrate and said counter substrate; and
   (d) a plurality of pixels, partitioned with a plurality of scanning lines and a plurality of signal lines, each of said pixels comprising:
      at least one thin-film transistor, having a gate electrode and a channel opposite said gate electrode;
      a color filter layer, formed on said at least one thin-film transistor;
      at least one pixel electrode controlled by said thin-film transistor, wherein said at least one pixel electrode has a pixel electrode face, wherein said pixel electrode face has a smooth upper surface; and
      a light-shielding film aligned to cover the channel of said at least one thin-film transistor, wherein said light-shielding film is formed between said color-filter layer and said at least one pixel electrode wherein all of said light-shielding film is enveloped between said at least one pixel electrode and said color filter layer;
      wherein said color filter layer, said light-shielding film, and said pixel electrode face comprise a multilayer structure, and wherein said light-shielding film and said pixel electrode face are substantially flat layers with respect to said first transparent insulating substrate; and wherein said at least one thin-film transistor is positioned such that said channel receives substantially no light coming through said first transparent insulating substrate.

2. A liquid-crystal panel according to claim 1, wherein said pixel electrode face extends at least partially over either an adjacent pair of said scanning lines, which borders said pixel, or an adjacent pair of said signal lines, which borders said pixel, or both.

3. A liquid-crystal panel according to claim 1, wherein said color filter layer is a red-, green- or blue-colored filter layer.

4. A liquid-crystal panel according to claim 1, wherein said color-filter layer is made of a photosensitive resin.

5. A liquid-crystal panel according to claim 1, wherein said light-shielding film has a thickness of no more than 5000 angstroms.

6. A liquid-crystal panel comprising:
(a) a thin-film transistor substrate comprising a first transparent insulating substrate;
(b) a counter substrate comprising a second transparent insulating substrate;
(c) a liquid crystal material between said thin-film transistor substrate and said counter substrate; and
(d) a plurality of pixels, partitioned with a plurality of scanning lines and a plurality of signal lines each of said pixels comprising:
at least one thin-film transistor, having a gate electrode and a channel opposite said gate electrode;
a color filter layer, formed on said at least one thin-film transistor;
at least one pixel electrode controlled by said thin-film transistor, wherein said at least one pixel electrode has a pixel electrode face, wherein said pixel electrode face has a smooth upper surface; and
a light-shielding film aligned to cover the channel of said at least one thin-film transistor, wherein said light-shielding film is formed on said at least one pixel electrode and below an oriented layer, wherein said oriented layer is formed on said thin-film transistor substrate, wherein all of said light-shielding film is enveloped between said at least one pixel electrode and said oriented layer;
wherein said color filter layer, said light-shielding film, and said pixel electrode face comprise a multilayer structure, and wherein said light-shielding film and said pixel electrode face are substantially flat layers with respect to said first transparent insulating substrate; and
wherein said at least one thin-film transistor is positioned such that said channel receives substantially no light coming through said first transparent insulating substrate.

7. A liquid-crystal panel according to claim 6, wherein said pixel electrode face extends at least partially over either an adjacent pair of said scanning lines, which borders said pixel, or an adjacent pair of said signal lines, which borders said pixel, or both.

8. A liquid-crystal panel according to claim 6, wherein said color filter layer is a red-, green- or blue-colored filter layer.

9. A liquid-crystal panel according to claim 6, wherein said color-filter layer is made of a photosensitive resin.

10. A liquid-crystal panel according to claim 6, wherein said light-shielding film has a thickness of no more than 5000 angstroms.

11. A liquid-crystal panel comprising:
a thin-film transistor substrate comprising a transparent insulating substrate;
a counter substrate;
a liquid crystal material disposed between said thin-film transistor substrate and said counter substrate;
a plurality of scanning lines;
a plurality of signal lines; and
a plurality of pixels, each of said pixels having a pixel area bordered by an adjacent pair of said scanning lines and an adjacent pair of said signal lines, each of said pixels comprising:
at least one thin-film transistor having a gate, a source/drain region and a channel region, wherein said pat is positioned between said source/drain region and said transparent insulating substrate;
a color filter layer, formed on said at least one thin-film transistor;
pixel electrode, controlled by said at least one thin-film transistor, wherein said pixel electrode has a pixel electrode face, wherein said pixel electrode face has a smooth upper surface, and wherein said pixel electrode face extends at least partially over either said adjacent pair of said scanning lines, which borders said pixel, or said adjacent pair of said signal lines which borders said pixel, or both; and
a light-shielding layer positioned relative to said channel region such that said light-shielding layer substantially blocks said channel region from light coming from a direction of said counter substrate, wherein said light-shielding layer is formed between said color-filter layer and said pixel electrode, wherein all of said light-shielding layer is enveloped between said pixel electrode and said color filter layer;
wherein said color filter layer, said light-shielding layer, and said pixel electrode face comprise a multilayer structure, and wherein said light-shielding film and said pixel electrode face are substantially flat layers with respect to said transparent insulating substrate.

12. A liquid-crystal panel according to claim 11, wherein said color-filter layer is made of a photosensitive resin.

13. A liquid-crystal panel according to claim 11, wherein said light-shielding layer has a thickness of no more than 5000 angstroms.

14. A liquid-crystal panel comprising:
a thin-film transistor substrate comprising a transparent insulating substrate;
a counter substrate;
a liquid crystal material disposed between said thin-film transistor substrate and said counter substrate;
a plurality of scanning lines;
a plurality of signal lines; and
a plurality of pixels, each of said pixels having a pixel area bordered by an adjacent pair of said scanning lines and an adjacent pair of said signal lines, each of said pixels comprising:
at least one thin-film transistor having a gate, a source/drain region and a channel region, wherein said gate is positioned between said source/drain region and said transparent insulating substrate;
a color filter layer, formed on said at least one thin-film transistor;
a pixel electrode, controlled by said at least one thin-film transistor, wherein said pixel electrode has a pixel electrode face, wherein said pixel electrode face has a smooth upper surface, and wherein said pixel electrode face extends least partially over either said adjacent pair of said scanning lines, which borders said pixel, or said adjacent pair of said signal lines, which borders said pixel, or both;

a light-shielding layer positioned relative to said channel region such that said light-shielding layer substantially blocks said channel region from light coming from a direction of said counter substrate; and an oriented layer formed on said thin-film transistor substrate, wherein said light-shielding layer is formed on said pixel electrode and below said oriented layer, wherein all of said light-shielding layer is enveloped between said pixel electrode and said oriented layer;

wherein said color filter layer, said light-shielding layer, and said pixel electrode face comprise a multilayer structure, and wherein said light-shielding film and said pixel electrode face are substantially flat layers with respect to said transparent insulating substrate.

15. A liquid-crystal panel according to claim 14, wherein said color-filter layer is made of a photosensitive resin.

16. A liquid-crystal panel according to claim 14, wherein said light-shielding layer has a thickness of no more than 5000 angstroms.

17. A liquid-crystal panel comprising:

(a) a thin-film transistor substrate comprising a first transparent insulating substrate;

(b) a counter substrate comprising a second transparent insulating substrate;

(c) a liquid crystal material between said thin-film transistor substrate and said counter substrate; and (d) a plurality of pixels, partitioned with a plurality of scanning lines and a plurality of signal lines, each of said pixels comprising:

at least one thin-film transistor, having a gate electrode and a channel opposite said gate electrode;

a color filter layer, formed on said at least one thin-film transistor;

at least one pixel electrode controlled by said thin-film transistor, wherein said at least one pixel electrode has a pixel electrode face, wherein said pixel electrode face has a smooth upper surface; and a light-shielding film aligned to cover the channel of said at least one thin-film transistor;

wherein said color filter layer, said light-shielding film, and said pixel electrode face comprise a multilayer structure, wherein said light-shielding film and said pixel electrode face are substantially flat layers with respect to said first transparent insulating substrate, and wherein said at least one pixel electrode is positioned to cover an entire upper surface of said light-shielding film, and said color filter layer is positioned to be covered by an entire lower surface of said light-shielding film;

wherein said at least one thin-film transistor is positioned such that said channel receives substantially no light coming through said first transparent insulating substrate.

18. A liquid-crystal panel according to claim 17, wherein said color-filter layer is made of a photosensitive resin.

19. A liquid-crystal panel according to claim 17, wherein said light-shielding film has a thickness of no more than 5000 angstroms.

20. A liquid-crystal panel according to claim 17, wherein said pixel electrode face extends at least partially over either an adjacent pair of said scanning lines, which borders said pixel, or an adjacent pair of said signal lines, which borders said pixel, or both.

21. A liquid-crystal panel comprising:

(a) a thin-film transistor substrate comprising a first transparent insulating substrate;

(b) a counter substrate comprising a second transparent insulating substrate;

(c) a liquid crystal material between said thin-film transistor substrate and said counter substrate; and (d) a plurality of pixels, partitioned with a plurality of scanning lines and a plurality of signal lines, each of said pixels comprising:

at least one thin-film transistor, having a gate electrode and a channel opposite said gate electrode;

a color filter layer, formed on said at least one thin-film transistor;

at least one pixel electrode controlled by said thin-film transistor, wherein said at least one pixel electrode has a pixel electrode face, wherein said pixel electrode face has a smooth upper surface;

a light-shielding film aligned to cover the channel of said at least one thin-film transistor; and an oriented layer formed on said thin-film transistor substrate;

wherein said color filter layer, said pixel electrode face, said light-shielding film, and said oriented layer comprise a multilayer structure, wherein said light-shielding film and said pixel electrode face are substantially flat layers with respect to said first transparent insulating substrate, and wherein said oriented layer is positioned to cover an entire upper surface of said light-shielding film, and said at least one pixel electrode is positioned to be covered by an entire lower surface of said light-shielding film;

wherein said at least one thin-film transistor is positioned such that said channel receives substantially no light coming through said first transparent insulating substrate.

22. A liquid-crystal panel according to claim 21, wherein said color-filter layer is made of a photosensitive resin.

23. A liquid-crystal panel according to claim 21, wherein said light-shielding film has a thickness of no more than 5000 angstroms.

24. A liquid-crystal panel according to claim 21, wherein said pixel electrode face extends at least partially over either an adjacent pair of said scanning lines, which borders said pixel, or an adjacent pair of said signal lines, which borders said pixel, or both.

* * * * *